Sept. 4, 1956
S. I. WARD
2,761,833
LIQUID TREATING APPARATUS
Filed Dec. 26, 1951
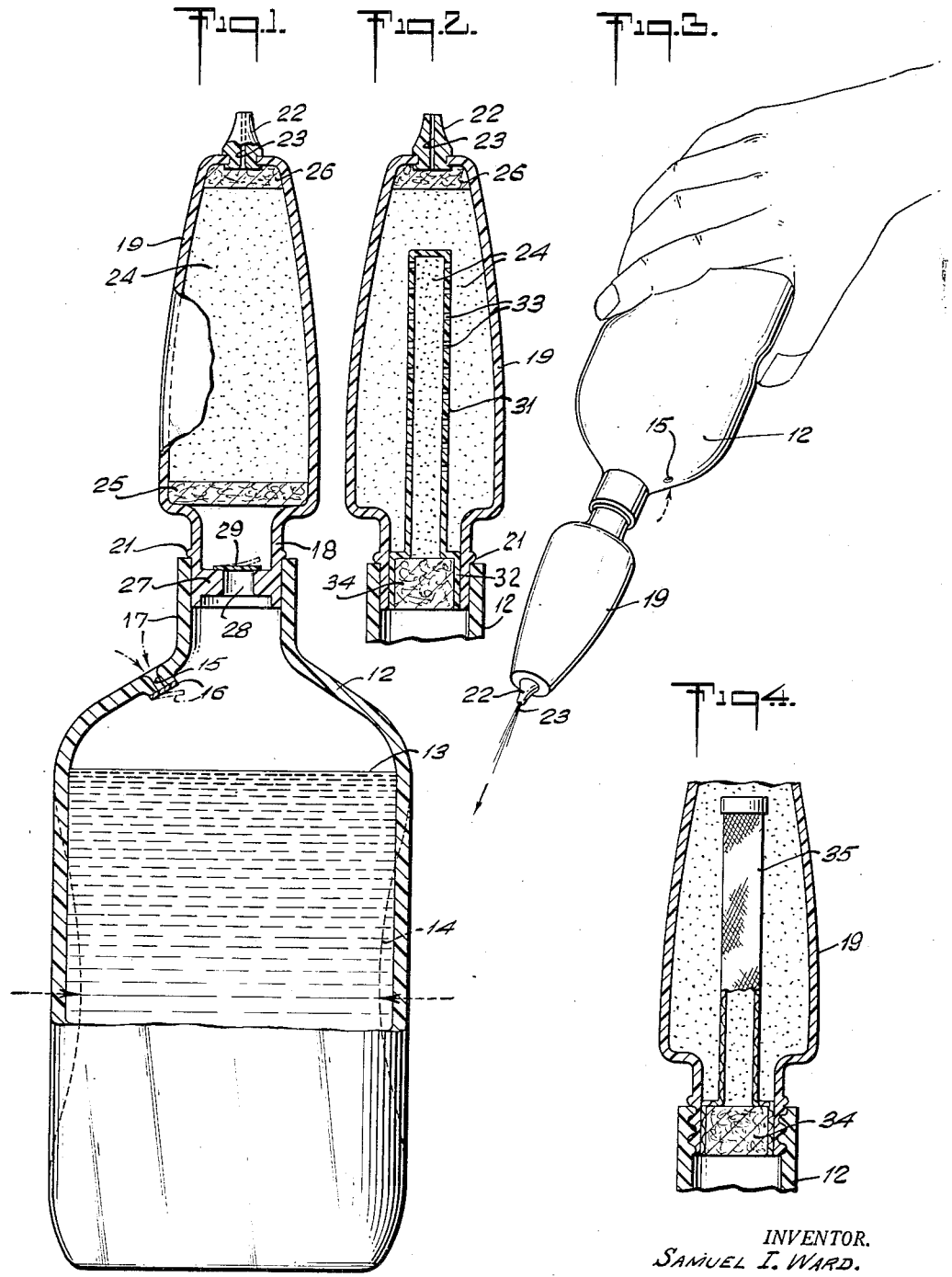
INVENTOR.
SAMUEL I. WARD.
BY I. Jordan Kunik
ATTORNEY.

United States Patent Office 2,761,833
Patented Sept. 4, 1956

2,761,833

LIQUID TREATING APPARATUS

Samuel I. Ward, West Hartford, Conn.

Application December 26, 1951, Serial No. 263,364

9 Claims. (Cl. 210—24)

This invention relates to liquid treating apparatus and more particularly to a portable hand-operated unit for demineralizing water in comparatively small volumes.

Demineralization of water by means of ion exchange resins has in recent years developed into extensive use, especially where there are large volume requirements as in electroplating processes and steam boiler operation and the like. It has been found that water treated by ion exchange resins is substantially as satisfactory as water obtained by the more costly and time consuming process of distillation.

The present invention, however, addresses itself to the particular problem of treating water in small volumes by means of ion exchange resins where suitably pure water is required in pharmacies, small laboratories, for storage battery servicing in gas stations and in the home for steam flat-irons and the like. For such uses I have invented a small portable hand-operated water demineralizer that delivers purified water in small quantities as desired and which is convenient to handle.

My invention has as an object a device which comprises essentially a reservoir container to one end of which there is detachably connected a cartridge containing a mass of ion exchange resins. The cartridge has inlet and outlet openings and when tap water from the container is transmitted through the cartridge, it is purified by the resins therein and emerges from an outlet opening in a sufficiently de-ionized state to be usable in various chemical and pharmaceutical applications, storage batteries, steam flat-irons and the like.

Other objects of the invention as well as the inventive features thereof will be apparent from the following description taken in connection wtih the drawing in which:

Figure 1 is an elevation of the demineralizing apparatus, partly in section;

Fig. 2 is a section view of the cartridge showing a form of baffle arranged therein;

Fig. 3 is a perspective view of the apparatus showing the manner in which a stream of purified liquid is ejected; and Fig. 4 is a fragmentary section view of the apparatus, showing an alternative baffle means as well as an alternative connection between the cartridge and the reservoir bottle.

Referring in detail to the drawing, wherein similar parts are given the same reference numerals, a reservoir bottle 12 is shown in Fig. 1 standing on its bottom and partly filled with water 13 such as may be obtained from a municipal water supply or from a well or the like.

The reservoir bottle may be made of any suitable material such as glass, pottery or metal, and it is preferably made of a transparent or translucent material having flexible walls which may be pressed inward by means of moderate finger and hand pressure as shown by the indented dashed line 14. It is found that a plastic material such as polyethylene is quite suitable for such bottles, as are other similar plastic materials having the same flexible and translucent properties.

In the shoulder of bottle 12 is an aspirating vent 15 which permits air to be drawn into bottle 12. A valve 16 is positioned on the inside of bottle 12 and is normally in the closed position over the internal aperture of vent 15. Valve 16 lifts away, as shown in dotted outline, when air enters bottle 12.

Inserted into the neck 17 of bottle 12 is the inlet neck 18 of cartridge 19, collar 21 on neck 18 serving to limit the extent of the insertion. The separable connection between neck 17 and neck 18 may be a press fit which is leak-proof, or it may take the form of a leak-proof screw fit as shown in Fig. 3. Other suitable means of coupling the cartridge to the bottle may be utilized.

Cartridge 19 is in the form of an elongated tube at the outlet end of which is positioned a nozzle 22 having a delivery aperture 23. Cartridge 19 is packed with a mass 24 of treating material which may consist of an ion exchange resin or a mixture of different varieties of ion exchange resins through which the untreated water from bottle 12 passes for the removal of various impurities. The mass of resins is supported by a permeable bed 25 of inert fibrous material such as glass wool, nylon, asbestos or polystyrene which has sufficient self-sustaining power to prevent said resins from falling back into bottle 12. A similar permeable bed 26 of fibrous material is positioned at the other end of mass 24 to prevent clogging of aperture 23. The walls of cartridge 19 may narrow down somewhat toward the outlet end in order to facilitate the saturation of the mass of resins packed therein.

In order to prevent treated water in the cartridge from flowing back into the reservoir bottle, it may be desirable to place in the neck of the cartridge a barrier disk 27 having an inlet vent 28 over which a suitable valve 29 is normally closed.

In operation, bottle 12 with the cartridge removed, is filled with untreated water and then the cartridge packed with the treating material is connected to the bottle. The bottle is then grasped in the operator's hand and is rotated or upturned as shown in Fig. 3 so that the water from bottle 12 flows by gravity through neck 18 (or through vent 28 if disk 27 is provided) into cartridge 19, there to be treated by the ion exchange resins. Since cartridge 19 has a somewhat elongated shape and its walls become narrower at the outlet end, the water to be treated passes at a slow enough rate so that it becomes properly demineralized. It will be noted that outlet aperture 23 is small enough to back up the flow of liquid so that the ion exchange resin mass becomes thoroughly saturated, whereby channeling through the treating mass is minimized and the water is treated to the fullest extent before leaving the cartridge.

If it is desired to accelerate the flow of liquid through the cartridge the flexible walls of bottle 12 may be gently squeezed by the hand of the operator. Of course, when the bottle is upturned and squeezed as in Fig. 3, valve 16 remains closed. When pressure is released, the walls of bottle 12 return to their original position as shown in Fig. 1 and air is drawn in by the aspirating action through vent 15 which lifts valve 16 away from the vent. When bottle 12 is restored to the upright position as in Fig. 1, some treated water may flow back from cartridge 19 into the bottle if valve 29 is optionally omitted. There is no serious drawback to this since the addition of a certain amount of treated water to the bottle will reduce the overall concentration of impurities in the reservoir water and thus on the subsequent traverse of water through the cartridge a lesser amount of ion exchange action will be required.

The use of vent 15 together with valve 16 is also optional and may be dispensed with. It has been found that after the pressed walls of bottle 12 have been released, an aspirating action can take place by way of the outlet and inlet openings of the cartridge (if valve 29 is omitted) and through the ion exchange mass which is not too tightly packed. This aspiration through the cartridge does not interfere with the water purifying action of the apparatus and does not cause any undue inconvenience.

If, however, it is desired not to permit any flow back of treated water into the reservoir bottle, the optional provision of disk 27, vent 28 and valve 29 serves to retain the treated but unused water in the cartridge, said treated water being next ejected when the bottle with the cartridge are turned over to be used again.

In order to ensure the complete saturation of the ion exchange resins in cartridge 19, it may be desired to insert therein a baffle means which will distribute the flow of liquid evenly throughout the packing. To that end, a baffle tube 31 is inserted into cartridge 19 and extends substantially throughout the length thereof, with the widened mouth 32 of said tube making a snug leak-tight fit with the inner periphery of neck 18 of the cartridge. Tube 31 has a series of perforations 33 distributed throughout its length. The inside of tube 31 is packed with the same ion exchange resins that are packed in the cartridge. The tube serves to back up and slow down the flow of liquid to some degree both through the tube and through the cartridge to ensure the more complete saturation of the ion exchange resins. Tube 31 may be made of any suitable inert material.

When a tube 31 is used, the bed 25 of fibrous material may be dispensed with and a similar bed 34 of fibrous material can be placed within the open mouth 32 of the tube to prevent the dropping of the resins into the reservoir bottle. Also the arrangement of disk 27, vent 28 and valve 29 may be included in the mouth of tube 31 as was inserted in neck 18 of the cartridge as shown in Fig. 1.

Alternatively, instead of a perforated tube, it may be desirable to utilize a tube 35 made of a meshed inert material as shown in Fig. 4. The meshed material permits the even flow of liquid along the whole length of the tube to facilitate the complete saturation of the liquid treating material. Instead of tubes 31 and 35, other suitable baffle means in the form of plates or fins may be properly placed within the mass of the ion exchange resins within the cartridge for slowing up and diverting the flow of liquid throughout the treating material.

Although the walls of cartridge 19 may be opaque, it is preferred that they be transparent or translucent so that a dye indicator integrated with the ion exchange resins may be visible therethrough. There are available certain dye materials mixed or integrated with the ion exchange resins which are capable of indicating by change of color when the resins are exhausted and will no longer remove impurities from water. Thus such change of color can be readily observed through the transparent or translucent walls of cartridge 19 and when exhaustion is indicated, the cartridge may be removed from the reservoir bottle and a new cartridge affixed thereto. The arrangement of the parts of the present invention make this replacement of the cartridge particularly easy and renders the apparatus widely useful in households, service stations, and photography and pharmacy laboratories and the like.

A simple set of instructions together with sample colors may be printed on a small label pasted on the cartridge to help the user of the apparatus recognize when the exhaustion point has been reached. If no dye is provided, the instructions may indicate the number of bottle loads of untreated water that can be purified by a single cartridge, said cartridge being rated depending upon the general section of the country where the relative hardness of the local water supply is well known.

In the specification, I have explained the principles of my invention and the best mode in which I have contemplated applying those principles, so as to distinguish my invention from other inventions; and I have particularly pointed out and distinctly claimed the part, improvement or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. A liquid treating apparatus comprising a bottle adapted to hold liquid therein, said bottle having flexible walls, the walls of said bottle being flexible when pressed and adapted by their inherent resiliency to return to their original position when pressure is released, an open neck in said bottle, a cartridge having an elongated shape, an inlet neck at one end of said cartridge and an outlet at the other end of said cartridge, said outlet being in the form of a nozzle and being substantially smaller than said inlet neck, said inlet neck being detachably connected to the open neck of said bottle whereby said cartridge extends externally of said bottle and makes a leak-tight seal therewith, and a mass of ion exchange resins in said cartridge, the squeezing of the flexible walls of said bottle causing the liquid therein to pass through and be treated by said mass of resins, and thereafter to emerge from said outlet.

2. An apparatus according to claim 1 wherein the walls of said cartridge taper to a narrower diameter from its inlet end toward its outlet end.

3. An apparatus according to claim 1 and further comprising a valve in the inlet neck of said cartridge whereby liquid treated by the resin is retained in said cartridge when the apparatus is not used to deliver purified liquid.

4. An apparatus according to claim 1 and further comprising a baffle tube inserted in the inlet neck of said cartridge and extending substantially throughout the length of said cartridge, said baffle having perforations along substantially its whole length whereby liquid entering said baffle is distributed substantially evenly throughout the mass of ion exchange resins.

5. An apparatus according to claim 1 in which the walls of said cartridge permit materials within said cartridge to be visible therethrough, and further comprising a dye mixed with said resins, said dye indicating substantially the exhaustion of said resins by a change of color, whereby said change of color may be observed through the walls of said cartridge.

6. A liquid treating apparatus comprising a container adapted to hold liquid therein, the walls of said container being flexible when pressed and adapted by their inherent resiliency to return to their original position when pressure is released, an outlet opening in said container, a cartridge extending externally of said container and adapted to hold a mass of ion exchange resins therein, an inlet opening and an outlet aperture in said cartridge, said cartridge with its contents being detachably connectible to said container whereby said opening in said container forms a liquid tight seal with said inlet opening in said cartridge, said outlet aperture being in the form of a nozzle for delivering treated liquid from said apparatus, the outlet aperture in said cartridge being substantially smaller than the inlet opening in said cartridge, the squeezing of the flexible walls of said container causing the liquid therein to pass through said cartridge and thereafter to emerge from said outlet aperture.

7. An apparatus according to claim 6 wherein the walls of said cartridge permit materials within said cartridge to be visible therethrough and further comprising a mass of ion exchange resins in said cartridge and a dye mixed with said resins, said dye having the property of changing color when said resins are exhausted, said color change being visible through the walls of the cartridge.

8. An apparatus according to claim 6, and further comprising a valve in the inlet opening of said cartridge, whereby any liquid passing from said container to said cartridge is prevented from flowing back into said container.

9. An apparatus according to claim 6, and further comprising an aspirating valve in said container whereby air may be drawn into said container after any liquid has passed from said container into said cartridge.

References Cited in the file of this patent

UNITED STATES PATENTS

| | | |
|---|---|---|
| 424,632 | Ware | Apr. 1, 1890 |
| 537,111 | Henderson | Apr. 9, 1895 |
| 672,207 | Dunn | Apr. 16, 1901 |
| 1,704,573 | Matthews | Mar. 5, 1929 |
| 2,014,236 | McNamara | Sept. 10, 1935 |
| 2,117,091 | Gudmundsen | May 10, 1938 |
| 2,167,225 | Van Eweyk | July 25, 1939 |
| 2,207,294 | Hubner | July 9, 1940 |
| 2,212,582 | Bellah | Aug. 27, 1940 |
| 2,389,185 | Dick | Nov. 20, 1945 |
| 2,573,731 | Ryberg et al. | Nov. 6, 1951 |
| 2,578,864 | Tupper | Dec. 18, 1951 |
| 2,643,771 | Pick | June 30, 1953 |

FOREIGN PATENTS

| | | |
|---|---|---|
| 479,062 | France | Feb. 9, 1916 |
| 295,004 | Great Britain | Dec. 20, 1928 |
| 360,172 | Great Britain | Nov. 5, 1931 |
| 713,917 | France | Nov. 4, 1931 |
| 493,539 | Great Britain | Jan. 6, 1937 |

OTHER REFERENCES

Technical Bulletin of the Rohm and Haas Co., Washington Square, Philadelphia 5, Pa., "Self-Indicating Amberlite for Monobed Deionization," May 1950.